United States Patent [19]

Krahenbuhl

[11] Patent Number: 4,679,280
[45] Date of Patent: Jul. 14, 1987

[54] FASTENERS FOR CHAINS, NECKLACES, BANGLES, AND SIMILAR PIECES OF JEWELRY

[76] Inventor: Roland Krahenbuhl, 30 route de Nogent-sur-Seine, Soucy, 89100 Sens, France

[21] Appl. No.: 873,431

[22] Filed: Jun. 4, 1986

Related U.S. Application Data

[63] Continuation of Ser. No. 672,589, Nov. 19, 1984, abandoned.

[30] Foreign Application Priority Data

Nov. 21, 1983 [FR] France ............................ 83 18471
Nov. 12, 1984 [FR] France ............................ 84 17203

[51] Int. Cl.[4] .................................................... A44B 13/02
[52] U.S. Cl. .................................... 24/233; 24/241 R; 24/241 PS
[58] Field of Search ............... 24/241 PS, 233, 232 R, 24/241 R

[56] References Cited

U.S. PATENT DOCUMENTS

| | | | |
|---|---|---|---|
| 1,128,719 | 2/1915 | Popperhusen | 24/233 X |
| 1,541,991 | 6/1925 | Moody et al. | 24/241 PS |
| 1,618,321 | 2/1927 | Woods | 24/241 PS |
| 1,672,710 | 6/1928 | Chittenden | 24/233 |
| 2,562,401 | 7/1951 | Wheeler | 24/233 |
| 4,401,334 | 8/1983 | Kraeling | 24/233 X |

FOREIGN PATENT DOCUMENTS

| | | | |
|---|---|---|---|
| 1481309 | 4/1967 | France | 24/241 R |
| 218295 | 3/1942 | Switzerland | 24/241 PS |

Primary Examiner—Kenneth J. Dorner
Assistant Examiner—Laurie K. Cranmer
Attorney, Agent, or Firm—Browdy and Neimark

[57] ABSTRACT

The fastener for chains, necklaces, bangles and similar pieces of jewelry comprises a main body connected by one end to the piece of jewelry, with this main body being cut out in a central area and supporting a heel extended by a spindle on which is pivotally mounted a square shaped rocker having a vertical arm which is submitted to bias of a spring-blade. In the rest state of the rocker, said rocker cooperates with a hook shaped end of the main body for maintaining a mobile free end of the piece of jewelry. Said main body is enclosed in a case provided with vertical side walls having windows with a cross-piece of a substantially H-shaped mobile part sliding therein.

9 Claims, 7 Drawing Figures

FASTENERS FOR CHAINS, NECKLACES, BANGLES, AND SIMILAR PIECES OF JEWELRY

This application is a continuation, of application Ser. No. 672,589, filed 11/19/84, now abandoned.

FIELD OF THE INVENTION

There are already known various fasteners used in jewelry, for example for chains, necklaces, bangles and similar articles. But these fasteners are not very safe owing to their small size, their mechanism is extremely fragile and can easily be jammed. The known fasteners comprise also such small members that they are not very strong.

The known fasteners necessitate therefore, obligatory the use of a small member, or safety chain, to reinforce the safety of the fastener.

The present invention copes with the above drawbacks by creating a safety fastener for pieces of jewelry which, while being of an extremely compact volume, is of a simple design and permits the use of sufficiently strong parts to give a great closing safety to the fastener.

SUMMARY OF THE INVENTION

According to the invention, the fastener for chains, necklaces, bangles and similar pieces of jewelry comprises a main body connected by one of its ends to the piece of jewelry, this main body being cut out in its central area and supporting a heel extended by a spindle on which is pivotally mounted a square shaped rocker having a vertical arm which is submitted to bias of a spring-blade so that, in the rest state of the rocker, the rocker cooperating with a hook shaped end of the main body maintains a mobile free end of the piece of jewelry. The main body is enclosed in a case provided with vertical side walls having windows with a cross piece of a mobile part sliding therein for causing the rocker to rotate in order to free the hook-shaped end and enabling the free end of the piece of jewelry to exit and respectively to enter rearwardly of the hook-shaped end in order to automatically hook the piece of jewelry on a person with no handling of the sliding mobile part. The square shaped rocker further comprises an end placed at a level lower than the hook shaped end, improving thereby the safety and facilitating introduction of the mobile free end of the piece of jewelry.

According to another feature of the invention, the sliding mobile part comprises, on its side walls, serrations facilitating the handling of the fastener, and teeth forming an abutment with edges of the case for limiting displacement of the sliding mobile part.

Various other features of the invention will be moreover revealed from the following detailed description.

BRIEF DESCRIPTION OF THE DRAWINGS

Embodiments of the invention are shown, as non-limitative examples, in the accompanying drawings wherein.

DESCRIPTION OF THE PREFERRED EMBODIMENTS

Figure 1:
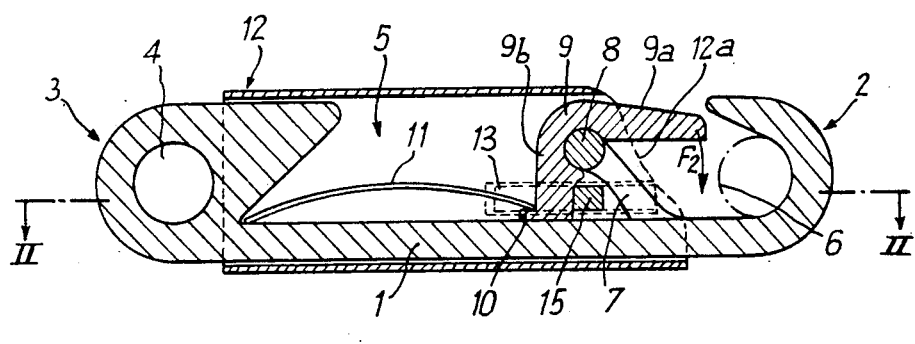
FIG. 1 is a longitudinal cross-sectional view of the fastener.

In FIG. 1, the fastener is formed by a main body 1 of a substantially parallelepipedic shape of which the right hand end 2 has the shape of a hook while the left hand end 3 is plain and has a central hole 4 provided for fixing one of the ends of a chain, a necklace, a bangle and other piece of jewelry.

The central area 5 of the main body 1 has been cut out so that the right end 2 forms a connecting ring for the other end of the chain, necklace, bangle and other piece of jewelry, which has been indicated at 6.

The cut out central area 5 has, in the vicinity of the hooking ring 2, a heel 7 which is therefore fixed onto the main body 1 and comprises a hooking spindle 8 on which is idly mounted a rocker 9 having substantially the shape of a right angled part or a square shape, the horizontal arm 9a of which cooperates with the hooking ring 2 for maintaining the end of the piece of jewelry 6. The vertical arm 9b has a tooth 10 at its lower part which is used as a hooking point for a spring blade 11 bent between the bottom of the cut out central area 5 in the vicinity of the end 3 and the heel of the rocker 9.

Because of the arcuate state of the spring blade 11, the spring blade 11 has a tendency to maintain the rocker 9 in the state shown in FIG. 1 i.e. in order that the fastener is in the closed state surrounding the end 6 of the piece of jewelry. Moreover, the end 9a of the rocker is placed at a level lower that the end of the hook 2 in order to improve the safety and to facilitate introduction of the part 6.

The above described unit is coated on its cut out central area 5 with a case 12 having, at its right hand part, a recessed area 12a permitting a free rotation of the rocker 9. The shape of the recessed area 12a does not permit to the end of the piece of jewelry 6 to come under the rocker for unlocking the fastener.

Figure 2:
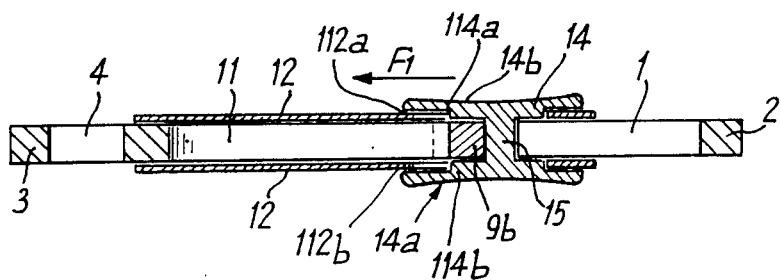
FIG. 2 is a cross-section taken along line II—II of FIG. 1 and shows the fastener from above.
Figure 3:
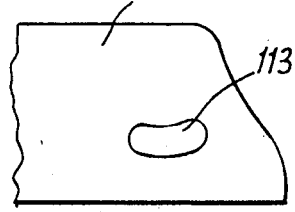
FIG. 3 is a side-elevation view of a variant of embodiment of a part of the fastener.

Moreover, the case 12 has, in its lower right hand part, two windows 13 which are provided at the side of the hook 2 and in which are engaged the outer parts of a sliding part 14 (see FIG. 2). The sliding part 14 comprises, in its median area, a cross-piece 15 bearing against the front lower part of the vertical arm 9b of the rocker 9 so that, when the sliding part 14 is pushed in direction of the arrow $F_1$ (FIG. 2) along the vertical outer walls of the case 12, the cross-piece 15, by sliding in the windows 13, pushes the vertical arm 9b of the rocker against bias of the spring blade 11. This movement causes a pivoting of the rocker 9 in the direction of the arrow $F_2$ (FIG. 1). In some cases, the windows 13 are substituted by apertures 113 (see FIG. 3) provided in the case 12, but in this case the cross-piece 15 is made of two parts with a round cross section.

The horizontal arm 9a of the rocker 9 frees the hook 2 which enables the end 6 of the piece of jewelry to be removed. By slackening the pressure exerted on the sliding part 14, the spring-blade 11 brings the rocker 9 back in its normal state and pushes thus the sliding part 14 back into its rest position.

It should be noted that the vertical side walls of the sliding part 14 are generally provided with gripping serrations 14a, 14b for facilitating the handling of the sliding part 14 by the fingers of the person putting in place the piece of jewelry.

In general, all the parts forming the fastener are made of gold or precious metal. Only the spring blade 11 is made of special steel. It should be noted, moreover, that the cross-piece 15 has a size such that, when it bears on one hand on the case 12 and the other hand on the heel 7, it allows sufficient room for the free movement of the rocker 9.

Samely, the shoulders 114a and 114b of the sliding part 14 form an abutment with the edge 112a and 112b of the case 12 in order to limit the displacement of the sliding part 14.

In the above mentioned embodiment, it has been found, however, that the H-shaped sliding part permitting the fastener to be opened was sometimes difficult to handle because some particles of dirt and the like (sand, for example) could be permanently housed in the space provided for the rocker to move, this space being located between the two parts of the case, the heel and the lower horizontal part of the rocker. These impurities interfered with the movement of the rocker, preventing its movement, making it difficult to free the end of the piece of jewelry.

These difficulties are particularly unpleasant when the person wearing the piece of jewelry is vacationing on a beach or travelling in very polluted areas.

The second embodiment copes with the above drawbacks by creating a fastener for chains, necklaces, bangles and similar pieces of jewelry, the closure of which is recessed in order to facilitate the handling for entrance and exit of the end part of the piece of jewelry the fastener of which permits a perfect rotation of the rocker and is closed to the foreign matter.

Figure 4:
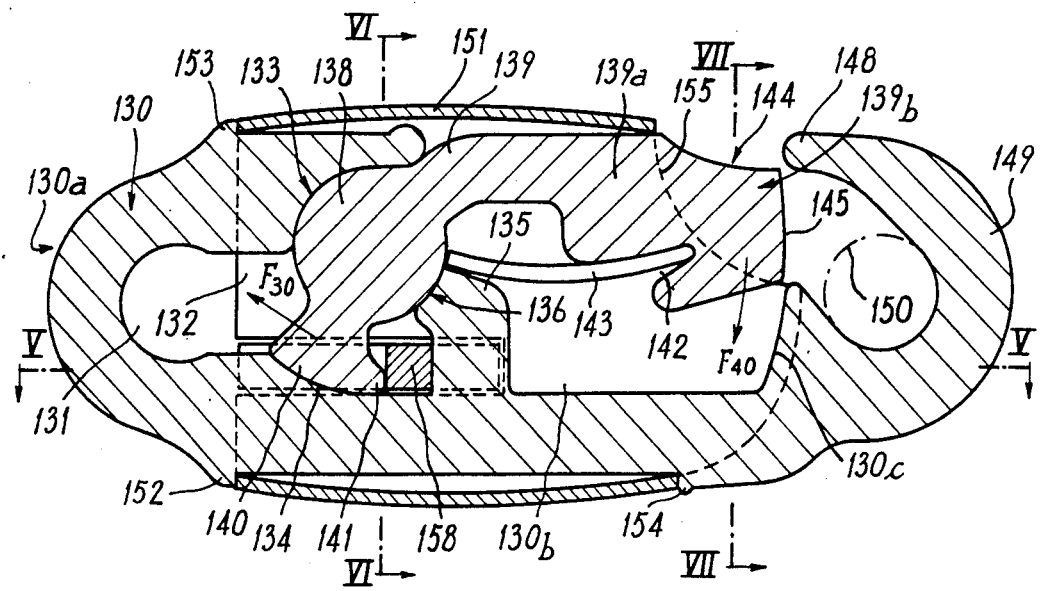
FIG. 4 is a longitudinal cross-section of another fastener in a locking state.
Figure 5:
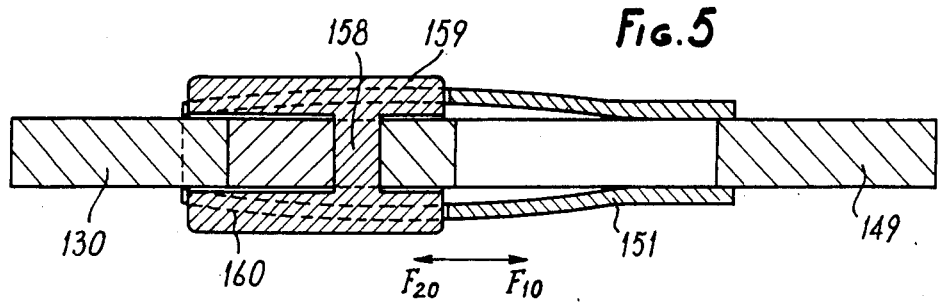
FIG. 5 is a cross-section taken along line V—V of FIG. 4.
Figure 6:
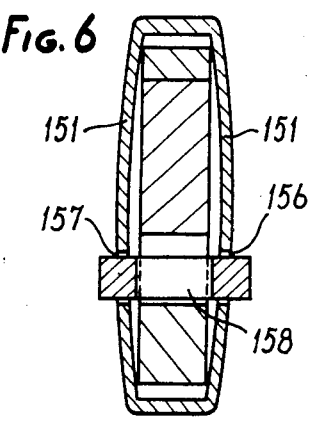
FIG. 6 is a cross-section taken along line VI—VI of FIG. 4.
Figure 7:
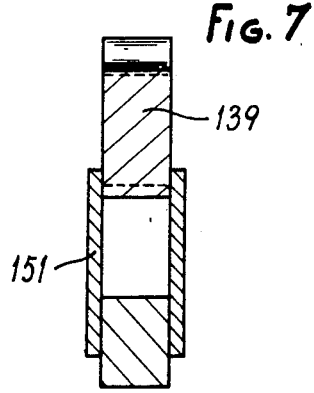
FIG. 7 is a cross-section taken along line VII—VII of FIG. 4.

In FIG. 4, the fastener is formed by a main body 130 having in its front area 130a the shape of a ring 131 the central recess of which is extended by a passage 132 leading, at its upper part, to a semi-cylindrical cut-out portion 133 and, at its lower part, to an arcuate chamber 134.

The body 130 is completely cut out in its central area 130b but has, between the arcuate chamber and the central area 130b, a vertical finger 135, the upper end of which is rounded at 136 in order to form, with the semi-cylindrical cut-out portion 133, two semi-cylindrical supports for the cylindrical central area 138 of the rocker 139, the first arm 140 of which bears on the upper surface of the arcuate chamber 134 and has an extension 141.

The horizontal portion 139a of the rocker forms a second arm and includes a recess 142 in which is housed one of the ends of a spring-blade 143 the other end of which comes into abutment against the central cylindrical part 138 of the rocker, without disturbing its free rotation. The spring blade pushes on the top of the heel 135. It is bent by the shape of the recess 142 and, when the rocker moves in direction of the arrow $F_{40}$, the spring blade rolls on the periphery of the upper rounded part of the vertical finger 135.

Finally, the horizontal portion 139a of the rocker includes at its upper part, a cut out portion 144 and, at its front part, a face 145 which is slightly rounded and which is placed in order to be flush with the edge 130c of the central cut out portion 130b.

In the closing state, the rocker 139 is in the position shown in FIG. 4 and the front ridge, formed by the cut out portion 144 and the rounded face 145, is near the upper end 148 of the hook 149 terminating the main body 130. In a same manner than in the embodiment of FIGS. 1-3, the hook 149 is provided to receive the ring 150 of a piece of jewelry which is closed by the fastener of the invention.

As shown in FIGS. 4, 5, 6 and 7, the central part of the main body 130 maintains a case 151 because of the shoulders 152, 153, 154 provided for this purpose on the outer periphery of the main body 130. The case 151 is provided on its front face with a wide recess 155 for freeing completely the hook 149 and the end 139b of the rocker 139.

As shown in the drawings, the side walls of the case 151 comprise two parallel grooves 156, 157 for passing a bar 158 fixed with two slides 159, 160 which can horizontally move in direction of the arrow $F_{20}$, then in direction of the arrow $F_{10}$ (see FIG. 5) by pushing the extension 141 of the first arm 140 in the direction of the arrow $F_{30}$ against the bias of the spring blade 143. The rocker 139 will thus pivot in the direction of the arrow $F_{40}$ (see FIG. 4) for freeing the inlet of the hook 149 and thereby enabling the ring 150 to come in or to get out. It suffices then to slacken the pressure exerted on the slides 159, 160 to provide that, under bias of the spring blade 149, the slides 159, 160 will come, in direction of the arrow $F_{10}$ (see FIG. 5), back to their rest state by freeing the bar 158. Therefore, the rocker 139 comes back to the state shown in FIG. 4.

As shown in the above disclosure, there is not, in the present embodiment, any pivot spindle for the rocker 138, which facilitates manufacturing of the fastener. The rotation of the rocker 138 is then guided by four surfaces which are partly cylindrical, i.e. the semi-circular cut out portion 133, the rounded area 136 of the finger 135, the arcuate chamber 134 and the rounded area 130c of the main body 130 which provides the rocker with a perfect equilibrium.

The case 151 is held by shoulders 152, 153, 154 forming abutments and, since the case 151 is slightly resilient and forcingly placed between the abutments 152 and 154, the case 151 is perfectly maintained.

Thus, at rest, the rocker is rotatively guided by three surfaces which are concentric to its center of rotation, and, upon aperture of the rocker a fourth guide 130c is added; the fourth guide 130c being very important since it provides, for the lower part of the opening, the tightness of the fastener.

In this respect, the upper part of the rocker near the opening in contact with the case provides the tightness, and the two parallel faces of the case which are not bulged permit with a minimum place the free rotation of the rocker while providing the tightness.

In the rest state of the rocker, the fastener being closed, it is impossible for particles of dirt and the like to come inside the fastener on the side of the opening but also on the side of the first arm of the rocker and of the upper part both concentric such as hereinbefore described and the vertical walls of the case.

The inner shape of the hook 149 cooperates with both the wide recess 155 in the front part of the case 151, and the upper end cut out portion 144 of the horizontal 139a portion of the rocker 139 permits the ring 150 either to come in or to get out easily so that, using only one hand to manipulate the slides 159, 160, it is possible to open or close the fastener by making the ring 150 to come in or to get out in a safe manner.

What is claimed is:

1. In a fastener comprising a main elongated body having two ends, with one end of said elongated body being provided to be fixedly connected to one end of a two-end piece of jewelry and an other end of said elongated body being hook-shaped; said elongated body further having a central recessed part supporting a heel including a spindle; an angle shaped rocker being pivotally mounted on said spindle and having two arms; spring means cooperating with one of the two arms of said angle shaped rocker and urging a second one of said two arms towards the hook shaped end of said elongated body to close said hook shaped end; and a casing at least partially enclosing said elongated body;

the improvement wherein said casing has two side walls each provided with an opening; and wherein the central recessed part is provided with a substantially H-shaped sliding part having a central portion and two wings, with said central portion being mounted between said heel and said one of the two arms of said angle shaped rocker, and said two wings being each provided to extend through said opening of the casing;

the central portion of the sliding part adapted to push said one arm of the angle shaped rocker against the bias of said spring means;

whereby slidingly pushing the wings of the substantially H-shaped sliding part causes the central portion thereof to pivot the angle-shaped rocker against biasing of said spring means and to open the hook shaped end of the elongated body for enabling the introduction therein of an end of said piece of jewelry, and whereby the wings of the H-shaped sliding part substantially cover the openings and prevent dirt and the like from entering the fastener.

2. The fastener of claim 1, wherein the wings of said substantially H-shaped sliding part are externally provided with serrations for facilitating handling of the fastener.

3. The fastener of claim 1, wherein the wings of said substantially H-shaped sliding part are interiorly provided with shoulders forming an abutment with edges of the casing for limiting displacement of the substantially H-shaped sliding part.

4. The fastener of claim 1, wherein the spring means is mounted between the central recessed part and said one of the two arms of said angle shaped rocker.

5. In a fastener comprising a main elongated body having two ends, with one end of said elongated body being provided to be fixedly connected to one end of a two-ended piece of jewelry and an other end of said elongated body being hook-shaped;

said body having a central area which is cut out to form a central recess and a central cut-out portion;

said central recess flares outwardly thereby defining a passage which leads to a semicylindrical cut-out portion on one side of the recess, and, at the lowest part of the passage, to an arcuate chamber;

a vertical finger having an upper end, said vertical finger located between the arcuate chamber and the central cut-out portion of the body, the upper end of the vertical finger forming a semi-cylindrical support for a central area of a rocker and a bearing area for a spring means;

said rocker being angle shaped and having a first arm and a second arm, a first end portion and a second end portion, and a horizontal cylindrical central area which is supported on the upper end of the vertical finger and rides on the semi-cylindrical cut portion of the central recess;

the first end portion of the rocker bears on an upper surface of the arcuate chamber;

the second arm of the rocker includes a recess in which is housed one end of said spring means one end of which rides on the central cylindrical portion of the rocker and is supported on the bearing area of the upper end of the vertical finger, the other end of which spring means rests inside the recess;

the second end portion of the rocker having a front part and including a cutout portion and, at the front part of said second end portion, a face portion which is slightly rounded, located flush with an edge of the central cut-out portion of the body;

and a casing at least partially enclosing said elongated body;

the improvement wherein said casing has two side walls each provided with an opening; and wherein the central recess of the body is provided with a substantially H-shaped sliding part having a central portion and two wings, with said central portion being mounted between said vertical finger and said first arm of the rocker, and said two wings being each provided to extend through one of the openings of the casing;

the central portion of the sliding part adapted and constructed to push said first arm of the angle shaped rocker against a bias of the spring means;

whereby slidingly pushing the wings of the substantially H-shaped sliding part causes the central portion thereof to pivot the angle-shaped rocker against biasing of said spring means and to open the hook shaped end of the elongated body for enabling introduction thereinto of an end of said piece of jewelry, and whereby the wings of the H-shaped sliding part substantially cover the openings of said casing and prevent dirt and the like from entering the fastener.

6. The fastener of claim 5, wherein at least one arm of said angle shaped rocker has an arcuate end slidingly cooperating with a corresponding arcuate portion of said central recess, said portion having a same center of rotation as that of said vertical finger.

7. The fastener of claim 5, wherein said second arm of said rocker has an arcuate end slidingly cooperating with a corresponding portion of said central recess having the same center of rotation said that of said vertical finger.

8. The fastener of claim 7 wherein said arcuate end is situated so as to close all of the space between the hook shaped end of the elongated body and said arcuate portion of said central recess.

9. The fastener of claim 5 wherein the wings of said substantially H-shaped sliding part are provided externally with serrations for facilitating handling of the fastener.

* * * * *